United States Patent [19]

Lee

[11] 4,425,376

[45] Jan. 10, 1984

[54] CONTACTLESS PELLET FABRICATION

[75] Inventor: Mark C. Lee, La Canada, Calif.

[73] Assignee: The United States of America as represented by the Administrator of the National Aeronautics and Space Administration, Washington, D.C.

[21] Appl. No.: 314,702

[22] Filed: Oct. 26, 1981

[51] Int. Cl.³ .................. B05D 3/00; B05D 1/00
[52] U.S. Cl. .................. 427/57; 65/213; 427/6; 427/346; 427/421; 427/426; 118/50; 118/50.1; 118/57; 118/62; 118/300; 118/500
[58] Field of Search .............. 427/6, 57, 346, 421, 427/426; 118/50, 50.1, 57, 62, 300, 500

[56] References Cited

U.S. PATENT DOCUMENTS

| 2,833,241 | 5/1958 | Crowley et al. | 118/62 |
|---|---|---|---|
| 3,365,315 | 1/1968 | Beck et al. | 65/22 X |
| 3,640,767 | 2/1972 | Fulton et al. | 427/57 X |
| 3,882,732 | 5/1975 | Fletcher et al. | 65/32 X |
| 4,017,290 | 4/1977 | Budrick et al. | 65/21.4 |
| 4,052,181 | 10/1977 | Fletcher | 65/2 |
| 4,218,921 | 8/1980 | Oran et al. | 308/10 |
| 4,257,799 | 3/1981 | Rosencwaig et al. | 65/22 X |
| 4,290,384 | 9/1981 | Aussehnitt | 427/57 |

OTHER PUBLICATIONS

J. E. Shelby, "Development of Glasses for application as Laser Fusion Targets", Sandia Laboratories, SAND 76-8325, Jan. 1977.

J. P. Reedy, "Selection and Measurement of Microsperes Laser Targets Based on Refraction", Journal of Applied Physics, v. 47, No. 61, Jun. 1976, p. 2503.

Primary Examiner—Shrive P. Beck
Attorney, Agent, or Firm—John R. Manning; Paul F. McCaul; Thomas H. Jones

[57] ABSTRACT

A small object (12, FIG. 2) is coated by holding it in the pressure well (20) of an acoustic standing wave pattern, and then applying a mist of liquid coating material (42) at low velocity into the pressure well. The pressure gradient within the well forces the mist particles to be pushed against the object. A lower frequency acoustic wave (for oscillator 28, FIG. 4) also can be applied to the coated object, to vibrate it so as to evenly distribute the coated material. The same lower frequency vibrations can be applied to an object in the shape of a hollow sphere, to center the inner and outer surfaces of the sphere while it remains suspended.

6 Claims, 7 Drawing Figures

4,425,376

CONTACTLESS PELLET FABRICATION

ORIGIN OF THE INVENTION

The invention described herein was made in the performance of work under a NASA contract and is subject to the provisions of Section 305 of the National Aeronautics and Space Act of 1958, Public Law 85-568 (42 Stat. 435; 42 USC 2457).

BACKGROUND OF THE INVENTION

Certain applications require the even coating of small objects or pellets. For example, inertial confinement fusion reactors require hollow spheres, containing hydrogen isotopes, and evenly coated with many layers of ablative materials. The object cannot be held by another solid object during coating or else there will be a defective spot in the coating. Contactless fabrication can be accomplished by applying a coating while the object is in free fall, but it is then difficult to apply a coating to the moving object, and there is some unevenness in the coating due to the wind passing the dropping object when there is air in the drop tower. It is also difficult to evenly coat a small object and with a controlled amount of coating material, since spraying of many droplets against the object may result in loss of an unknown amount of material, and the force of a spray may knock the object out of position. A technique which facilitated the precise coating of a small object, as well as other fabricating techniques, would be of considerable value.

SUMMARY OF THE INVENTION

In accordance with one embodiment of the present invention, a process is provided for fabricating a small object without contacting it. Coating of the object can be accomplished by first acoustically suspending the object by applying resonant acoustic energy to a gas-filled area to hold the object within a pressure well of a standing wave pattern. A multiplicity of fine quantities of coating material, or mist thereof, can be applied at low velocity to the pressure well. The pressure gradient within the well then forces the coating material against the suspended object.

The coating material can be more evenly distributed about the object, by applying a low frequency acoustic wave that oscillates the coating material to more evenly distribute the coating thereon. Where the object is a hollow sphere, such resonant oscillations also can be utilized in the formation of the hollow sphere while it is molten, to position its inner and outer spherical surfaces concentric to one another.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
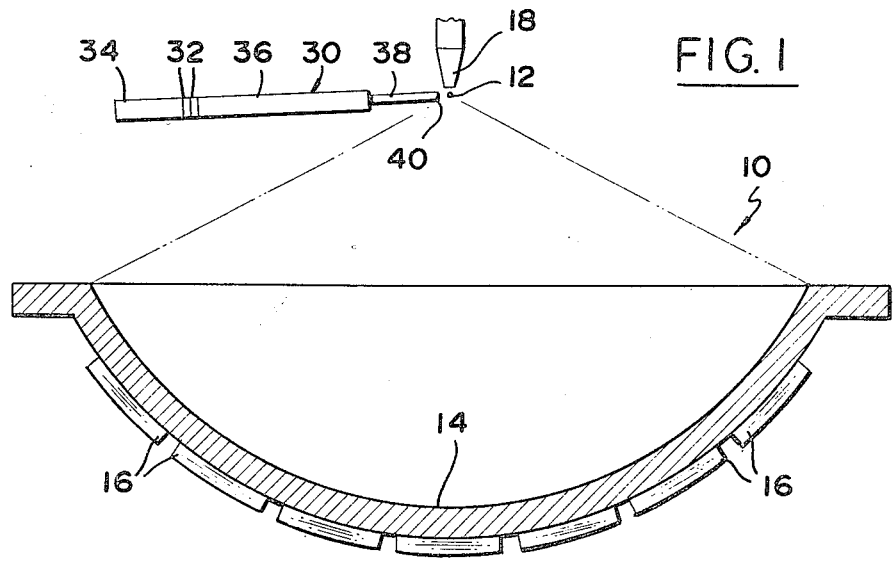
FIG. 1 is a sectional side view showing a coating process of the present invention.
Figure 2:
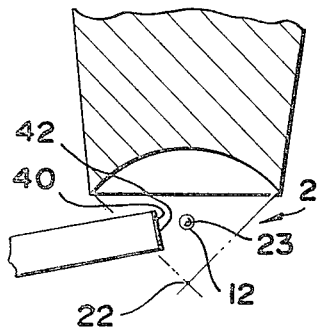
FIG. 2 is an enlarged view of a portion of FIG. 1.

FIGS. 1 and 2 illustrate a system 10 which can be used to acoustically levitate a small object 12. The system includes a large dish 14 with transducers 16 thereon, and a reflector 18 positioned near the focus of the dish, with air or other gaseous medium between them. The system produces a converging acoustic field with a pressure well at 20 which is located slightly beyond the focal point 22 of the dish 14. A large static pressure gradient lies around the pressure well 20 with the pressure increasing in every direction away from the center 23 of the well, and the object 12 is held close to the center of the pressure well. Where an acoustic wave of high intensity is propagated, the effect of gravity is to lower the object 12 only slightly. Where the object 12 is a hollow glass sphere, it lies substantially at the center of the pressure well. Such hollow spheres, with pressured hydrogen gas isotopes therein and a coating of an ablating material, are useful as targets in inertial confinement fusion reactors.

Figures 3, 4, 5:
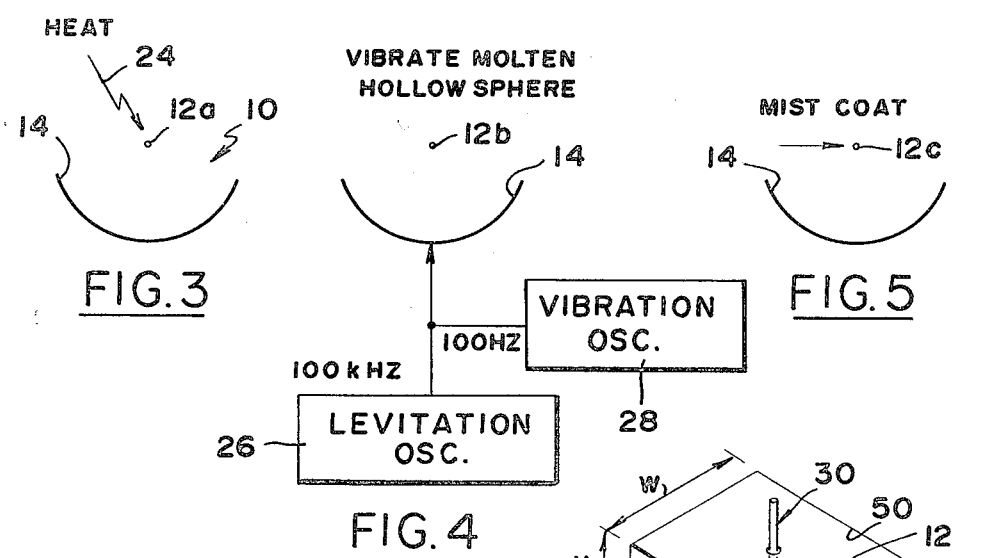
FIG. 3 is shows one step in the production of a hollow sphere utilizing the method of the invention.
FIG. 4 shows another step in the production of the hollow sphere, following the step of FIG. 3.
FIG. 5 shows another step in the production of the hollow sphere, following the step of FIG. 4.

FIGS. 3-5 illustrate some of the steps in the fabrication of a fusion reactor target which includes a coated hollow sphere. A glass frit, such as of Pyrex containing a blowing agent, is placed in the pressure well of a levitating system of the type shown in FIG. 1. Heat is applied, as by a laser beam indicated by the arrow 24, (FIG. 3) to blow the frit into a small hollow body. FIG. 4 shows a next step in the process, wherein the acoustically levitated hollow body at 12b is vibrated to form it into an accurately shaped hollow sphere with concentric inner and outer surfaces. In a system of the type shown in FIG. 1, with a dish 14 of about 12 inches diameter, a levitating frequency of about 100 kHz may be utilized (although there are several resonant frequencies of that order of magnitude that can be used). A small hollow glass sphere of a diameter on the order of a millimeter, may have a natural frequency of oscillation on the order of 100 Hz. By applying both a relative low frequency such as 100 Hz to vibrate the levitated object at 12b as well as the much higher levitating frequency, the object can be vibrated without contacting it.

In FIG. 4, a levitation oscillator 26 is used to apply a high levitating frequency such as 100 kHz to the transducers on the dish 14. In addition, a vibration oscillator 28 is used, which provides a much lower frequency such as 100 Hz to the same transducers. The low frequency from the oscillator 28 is applied while the object at 12b is still molten, but is decreasing in temperature towards a hardened state. The resulting hollow sphere at 12b tends to have spherical surfaces regardless of the vibrations, but the vibrations serve to cause the inner and outer spherical surfaces to lie concentric to one another, to produce a hollow sphere with substantially uniform wall thickness. The fact that the vibrations are performed on the molten sphere without a wind blowing thereby (as can occur when the object is vibrated during its fall in an air-filled drop tower) helps to avoid deformities from the desired spherical configuration.

The hollow sphere can be filled with pressured hydrogen gas by a variety of techniques, such as by placing the hardened sphere in a pressure chamber containing the hydrogen gas isotopes, for a few days until the hydrogen permeates the sphere.

After the sphere has been formed, it must be coated with a thin layer of ablative material such as a metal of moderate melting temperature. This can be accomplished, as shown in FIG. 5, by holding the sphere at 12c in acoustic suspension, while a mist of the molten coating material is applied to the sphere. This technique is shown in greater detail in FIGS. 1 and 2, which show that the coating material is applied by the use of a stepped horn atomizer 30. The atomizer 30 includes a pair of piezoelectric transducers 32 driven at 20 kHz, a backup rod 34 behind the transducers, a forward rod 36 in front of the transducers, and a stepped horn 38 in front of the forward rod. A small quantity 42 (FIG. 2) of a coating material can be applied to the extreme tip 40 of the rod, with the horn and coating material at a temperature above the melting point of the coating material. The transducers 32 are driven through an oscillator, which causes breakup of the drop 42 into a mist which emerges immediately in front of the tip 40. The mist includes very fine droplets of diameters on the order of one micron, with a volume that is a plurality of orders of magnitude less than that of the sphere, so the droplets cannot move at high velocity for any appreciable distance. The transducers of the atomizer are driven after the tip 40 has been placed substantially within the pressure well around the sphere 12. The pressure gradient in the well forces the mist of coating material towards the center of the pressure well, where the sphere 12 is located, to thereby coat the sphere.

After the sphere has been coated, and at a time when the coating material is flowable, as at a time soon after the laser heat beam 24 was applied, low frequency (e.g. 100 Hz) acoustic energy is applied to them. This produces vibrations of the coating material to more evenly distribute it. A low frequency is chosen which produces such vibrations of the coating material. The frequency, which depends on the density, surface tension, and total mass of the coating material can be determined by observing it through a microscope while varying the low frequency until coating material oscillations are observed. When the coating material has cooled, the hollow sphere can be tested to determine whether it is ready for use as a target in an inertial confinement fusion reactor.

A variety of acoustic suspension systems can be utilized to acoustically levitate the sphere or other object during processing. The system of FIG. 1 can be modified by using a long trough instead of the dish 14, and moving the object along the trough by moving the reflector 18, to bring the sphere to various processing stations above the trough.

Figure 6:
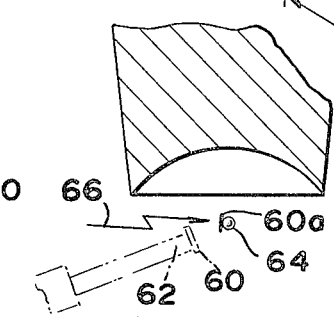
FIG. 6 is an enlarged sectional view of another method of the invention.

While many coating materials can be easily formed into a mist, it is often difficult to do so with some metals. A quantity of such metal or other coating material such as is shown at 60 in FIG. 6, of moderately high melting temperature, can be applied by holding it in a vacuum chuck 62. The chuck is moved to bring the material at 60a against the acoustically levitated sphere 64, and the coating material is melted while it is in contact with the sphere as by applying a laser beam 66. While the coating material is still molten, a low oscillation frequency resonant to the coating, such as of an order of magnitude of 100 Hz, is applied to vibrate the coating material to evenly distribute it on the surface of the sphere.

Figure 7:
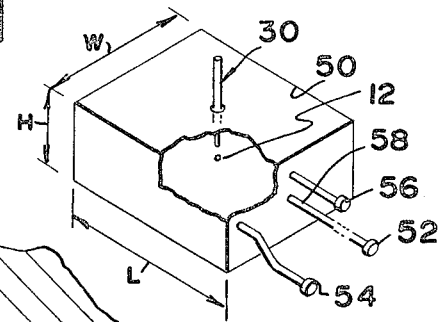
FIG. 7 is a perspective view of another fabricating apparatus and method of the invention.

It is also possible to use a substantially closed chamber of the type shown at 50 in FIG. 7, wherein the walls form a chamber of square cross section, and three transducers 52, 54, and 56 are used to generate acoustic waves resonant to the length L, width W and height H of the chamber. Each of the transducers such as 52 is shown connected to the chamber through a tube 58 of a length equal to one-half of the wavelength of sound transmitted therethrough, to facilitate coupling. In FIG. 7, a coating is shown being applied to a hollow sphere 12, by a stepped horn atomizer 30 of the type shown in FIG. 1.

Thus, the invention provides a system for processing small objects such as hollow spheres, while avoiding contact therewith during much of the processing. The coating of the sphere can be accomplished by acoustically levitating the sphere in a pressure well, and applying a mist of coating material to the pressure well, so that the pressure gradient presses the mist of coating material against the object. The object can be vibrated, by applying soundwaves of a much lower frequency than used for levitation and which is resonant to the object, to cause object vibrations that help distribute the coating. Such vibrations are also useful while a hollow sphere is still in a molten state, to help center the inner and outer surfaces of the sphere while the object is out of contact with any solid and there is substantially no wind on the object.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A process for coating an object comprising:
applying resonant acoustic energy to a gas-filled area, that establishes a standing wave pattern with at least one pressure well at which there is a pressure gradient with pressure increasing in every direction away from the center of the pressure well;
suspending an object in said pressure well; and
applying a coating to said object, including introducing a multiplicity of fine quantities of coating material to a region containing said object, whereby to allow the pressure around the well to press the fine coating material quantities against the object.

2. The process described in claim 1 wherein:
said step of applying a coating includes applying a controlled amount of a liquid coating material to the tip of an atomizer device, placing said tip within said pressure well, and atomizing said coating material.

3. The process described in claim 1 including:
applying additional acoustic energy to said suspended object, after said coating has been applied and while said coating is in a liquid state, of a frequency which is lower than said resonant frequency and which creates oscillations of said coating material, whereby to evenly distribute said coating.

4. A process for coating an object comprising:
applying resonant acoustic energy to a gas-filled area, that establishes a standing wave pattern with at least one pressure well at which there is a pressure gradient with pressure increasing in every direction away from the center of the pressure well;
suspending an object in said pressure well;
applying a quantity of solid coating material to said object; and applying heat to said solid coating material while it lies on said suspended object, to melt the coating material.

5. The process described in claim 4 including: applying acoustic energy of a second frequency much lower than the frequency of said energy that establishes a standing wave pattern, and which produces oscillations of said coating material, to said object with said coating material thereon while said material is molten.

6. Apparatus for coating an object, comprising:
an acoustic levitator which includes at least two walls lying opposite one another, and means for establishing an acoustic standing wave pattern with a pressure well, between the walls; and
means having a tip, for forming a drop of liquid at the tip into a mist at a location directly in front of said tip, said means being positionable with said tip between said walls and in substantially said pressure well to apply the mist to said pressure well.

* * * * *